United States Patent
Lee et al.

(10) Patent No.: US 8,724,570 B2
(45) Date of Patent: May 13, 2014

(54) METHOD AND APPARATUS FOR EXECUTING CARRIER MANAGEMENT PROCESS IN MULTI-CARRIER SUPPORTING BROADBAND WIRELESS COMMUNICATION SYSTEM

(75) Inventors: Eun Jong Lee, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 13/263,335

(22) PCT Filed: Apr. 9, 2010

(86) PCT No.: PCT/KR2010/002191
§ 371 (c)(1),
(2), (4) Date: Jan. 3, 2012

(87) PCT Pub. No.: WO2010/117232
PCT Pub. Date: Oct. 14, 2010

(65) Prior Publication Data
US 2012/0093103 A1    Apr. 19, 2012

Related U.S. Application Data

(60) Provisional application No. 61/168,204, filed on Apr. 9, 2009.

(30) Foreign Application Priority Data

Apr. 1, 2010  (KR) .................. 10-2010-0029717

(51) Int. Cl.
*H04W 4/00* (2009.01)
(52) U.S. Cl.
USPC .......................................... 370/329; 455/450

(58) Field of Classification Search
USPC ........................................................ 370/329
See application file for complete search history.

(56) References Cited

U.S. PATENT DOCUMENTS

| | | |
|---|---|---|
| 2008/0287137 A1 | 11/2008 | Li et al. |
| 2008/0299985 A1 | 12/2008 | Yang et al. |
| 2009/0116384 A1* | 5/2009 | Kim et al. .................. 370/230 |
| 2010/0234037 A1* | 9/2010 | Terry et al. .................. 455/450 |

FOREIGN PATENT DOCUMENTS

| | | |
|---|---|---|
| JP | 2007221745 | 8/2007 |
| KR | 1020060074274 | 7/2006 |

* cited by examiner

*Primary Examiner* — Huy D Vu
*Assistant Examiner* — Kevin Cunningham
(74) *Attorney, Agent, or Firm* — Lee, Hong, Degerman, Kang & Waimey

(57) ABSTRACT

The present invention relates to a broadband wireless communication system, and disclosed are a method and an apparatus for executing a carrier management process in a broadband wireless communication system which supports multi-carrier. According to one embodiment of the present invention, a method for executing carrier management by a terminal in a communication system which supports the multi-carrier comprises the steps of: receiving a signal which indicates control channel allocation for a 1st carrier from a base station; receiving a signal which indicates control channel de-allocation for a 2nd carrier from the base station; activating the 1st carrier if the 1st carrier on which the control channel allocation is indicated is in an inactivate state; and inactivating the 2nd carrier if the 2nd carrier on which the control channel de-allocation is indicates is in an activated state.

10 Claims, 6 Drawing Sheets

(a)

(b)

METHOD AND APPARATUS FOR EXECUTING CARRIER MANAGEMENT PROCESS IN MULTI-CARRIER SUPPORTING BROADBAND WIRELESS COMMUNICATION SYSTEM

CROSS-REFERENCE TO RELATED APPLICATIONS

This application is the National Stage filing under 35 U.S.C. 371 of International Application No. PCT/KR2010/002191, filed on Apr. 9, 2010, which claims the benefit of earlier filing date and right of priority to Korean Application No. 10-2010-0029717, filed on Apr. 1, 2010, and also claims the benefit of U.S. Provisional Application Ser. No. 61/168,204, filed on Apr. 9, 2009.

TECHNICAL FIELD

The following description relates to a broadband wireless communication system, and more particularly, to a method and apparatus for performing a carrier management procedure in a broadband wireless communication system supporting multiple carriers.

BACKGROUND ART

In a general wireless communication system, only one carrier is mainly considered even though uplink and downlink bandwidths are differently configured. For example, a wireless communication system in which the number of carriers constituting each of uplink and downlink is one and an uplink bandwidth and a downlink bandwidth are generally symmetrical may be provided based on a single carrier. However, frequency allocation of a wide bandwidth is not easy except in some areas of the world. Accordingly, as a technique for efficiently using a fragmented narrowband, a carrier aggregation (also called bandwidth aggregation or spectrum aggregation) technique producing an effect as if a broadband is logically used by physically aggregating a plurality of bands in a frequency domain has been developed.

Carrier aggregation has been introduced to support increased throughput, prevent cost increase caused by introduction of a broadband RF element, and ensure compatibility with a conventional system. Carrier aggregation may include a technique supporting a system bandwidth of up to 100 MHz using multiple carriers even if one carrier supports, for example, a bandwidth of 5 MHz, 10 MHz, or 20 MHz. In addition, in a carrier aggregation technique, asymmetrical bandwidths may be allocated to uplink and downlink.

In a multi-carrier support system, a Mobile Station (MS) supporting multiple carriers may transmit and receive data through one or more carriers. The maximum number of carriers that can be used by the MS may differ according to the performance or capacity of the MS. Alternatively, the maximum number of carriers provided to the MS may be determined according to a Base Station (BS) policy. The MS needs to efficiently manage multiple carriers that can be used thereby.

DETAILED DESCRIPTION OF THE INVENTION

Technical Problems

A new method for efficiently performing carrier management without additional signaling in a multi-carrier support system is needed. In addition, a method is needed for efficiently managing multi-carrier activation/deactivation to perform signaling such that assigned carriers (or available carriers) are set to active carriers or vice versa.

Technical Solutions

To solve the above-described technical problem, a method for performing carrier management in a mobile station of a communication system supporting multiple carriers according to an embodiment of the present invention includes receiving a signal indicating allocation of a control channel for a first carrier from a base station, receiving a signal indicating deallocation of the control channel for a second carrier from the base station, activating the first carrier when the first carrier for which allocation of the control channel is indicated is in a deactivated state; and deactivating the second carrier when the second carrier for which deallocation of the control channel is indicated is in an activated state.

The signal indicating allocation of the control channel and the signal indicating deallocation of the control channel may be received on a carrier activated between the base station and the mobile station.

The first and second carriers may be secondary carriers among the multiple carriers.

The first and second carriers may be downlink carriers and the control channel may be a Channel Quality Indicator Channel (CQICH).

The first and second carriers may be uplink carriers and the control channel may be either a ranging channel or a sounding channel.

To solve the above-described technical problem, a method for supporting carrier management in a base station of a communication system supporting multiple carriers according to another embodiment of the present invention includes transmitting a signal indicating allocation of a control channel for a first carrier to a mobile station, and transmitting a signal indicating deallocation of the control channel for a second carrier to the mobile station, wherein the first carrier is activated when the first carrier for which allocation of the control channel is indicated is in a deactivated state, and wherein the second carrier is deactivated when the second carrier for which deallocation of the control channel is indicated is in an activated state.

The signal indicating allocation of the control channel and the signal indicating deallocation of the control channel may be received on a carrier activated between the base station and the mobile station.

The first and second carriers may be secondary carriers among the multiple carriers.

The first and second carriers may be downlink carriers and the control channel may be a Channel Quality Indicator Channel (CQICH).

The first and second carriers may be uplink carriers and the control channel may be either a ranging channel or a sounding channel.

To solve the above-described technical problem, a mobile station performing carrier management in a communication system supporting multiple carriers according to still another embodiment of the present invention includes a reception module for receiving a control signal and data from a base station; a transmission module for transmitting a control signal and data to the base station; and a processor connected to the reception module and the transmission module, for controlling the mobile station including the reception module and the transmission module, wherein the processor is further configured to control the mobile station to receive, through the reception module, a signal indicating allocation of a control channel for a first carrier from the base station, to receive, through the reception module, a signal indicating deallocation of the control channel for a second carrier from the base station, to activate the first carrier when the first carrier for which allocation of the control channel is indicated is in a deactivated state, and to deactivate the second carrier when the second carrier for which deallocation of the control channel is indicated is in an activated state.

To solve the above-described technical problem, a base station supporting carrier management in a communication system supporting multiple carriers according to a further embodiment of the present invention includes a reception module for receiving a control signal and data from a mobile station; a transmission module for transmitting a control signal and data to the mobile station; and a processor connected to the reception module and the transmission module, for controlling the base station including the reception module and the transmission module, wherein the processor is further configured to control the base station to transmit, through the transmission module, a signal indicating allocation of a control channel for a first carrier to the mobile station, and to transmit, through the transmission module, a signal indicating deallocation of the control channel for a second carrier to the mobile station, to wherein the first carrier is activated when the first carrier for which allocation of the control channel is indicated is in a deactivated state, and to wherein the second carrier is deactivated when the second carrier for which deallocation of the control channel is indicated is in an activated state.

Advantageous Effects

In a carrier management procedure of a wireless communication system supporting multiple carriers, a method for efficiently managing activation or deactivation of multiple carriers is provided. A method for reducing communication overhead is provided by implicitly indicating activation or deactivation of a secondary carrier using control channel allocation or deallocation for a corresponding secondary carrier among multiple carriers.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Figure 1:
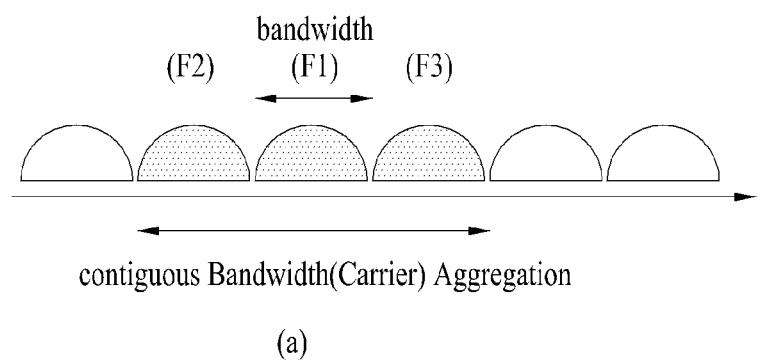
FIG. 1 shows contiguous and non-contiguous carrier aggregation.
Figure 1:
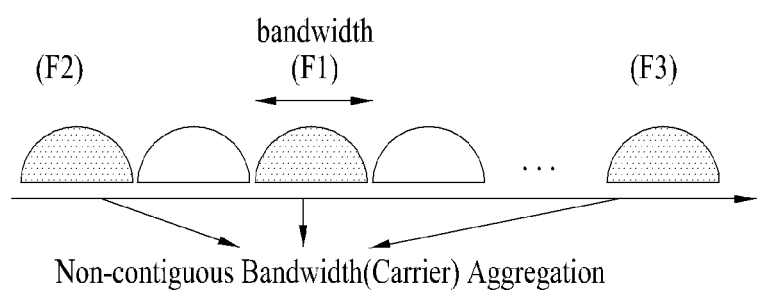

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a terminal. Here, the base station refers to a terminal node of a network communicating directly with the terminal. In some cases, a specific operation described as being performed by the base station may be performed by an upper node of the base station.

Namely, it is apparent that, in a network comprised of a plurality of network nodes including a base station, various operations performed for communication with a mobile station may be performed by the base station, or network nodes other than the base station. The term 'Base Station' (BS) may be replaced with the term fixed station, Node B, eNode B (eNB), access point, or Advanced BS (ABS) supported in an IEEE 802.16m system. The term 'relay' may be replaced with the term Relay Node (RN) or Relay Station (RS). The term 'terminal' may be replaced with the term User Equipment (UE), Mobile Station (MS), Mobile Subscriber Station (MSS), Subscriber Station (SS), or Advanced MS (AMS) supported in an IEEE 802.16m system.

The specific terms used in the following description are provided to aid in understanding of the present invention and those terms may be changed without departing from the spirit of the present invention.

In some instances, known structures and devices are omitted or are shown in block diagram form, focusing on important features of the structures and devices, so as not to obscure the concept of the present invention. The same reference numbers will be used throughout this specification to refer to the same or like parts.

The embodiments of the present invention can be supported by standard documents disclosed in at least one of wireless access systems, i.e., IEEE 802, 3GPP, 3GPP LTE, and 3GPP2. Namely, among the embodiments of the present invention, steps or parts which are not described to clarify the technical features of the present invention can be supported by the above standard documents. Also, all terms disclosed herein can be described by the above standard documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied with radio technology such as IEEE 802.11 (Wi-Fi), IEEE 802.16 (WiMAX), IEEE 802-20, and Evolved UTRA (E-UTRA). UTRA is a part of the Universal Mobile Telecommunications System (UMTS). 3rd Generation Partnership Project (3GPP) Long Term Evolution (LTE) is a part of the Evolved UMTS (E-UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e specification (WirelessMAN-OFDMA Reference System) and an advanced IEEE 802.16m specification (WirelessMAN-OFDMA Advanced System). For clarity, the following description focuses on the 3GPP LTE and 3GPP LTE-A systems. However, technical features of the present invention are not limited thereto.

FIG. 1 shows contiguous carrier aggregation (FIG. 1a) and non-contiguous carrier aggregation (FIG. 1b) in a multi-carrier aggregation technique. To transmit and receive signals through multiple bands, both a transmitter and a receiver need to include an RF module for transmitting and receiving signals through multiple bands. In the following description, it is assumed that both the transmitter and receiver can transmit and receive multiple carriers.

Contiguous carrier aggregation as shown in FIG. 1a uses contiguous carriers in a frequency domain and non-contiguous carrier aggregation as shown in FIG. 1b uses discontiguous carriers. For example, contiguous carrier aggregation and/or non-contiguous carrier aggregation may be supported by a common Medium Access Control (MAC) technique. The common MAC technique refers to management of a plurality of carriers (or Frequency Allocation (FA) bands)) in one MAC entity. Since the plurality of carriers managed in one MAC entity does not need to be contiguous to each other, flexible resource management can be provided.

The number of carriers aggregated in uplink and the number of carriers aggregated in downlink may be differently configured. When the number of downlink carriers is equal to the number of uplink carriers, this is called symmetrical aggregation, and when they are different, this is called asymmetrical aggregation.

The sizes (i.e. bandwidths) of multiple carriers in carrier aggregation may differ from each other. For example, when five carriers are used to configure a band of 70 MHz, the carriers may be configured as a 5 MHz carrier (carrier #0)+a 20 MHz carrier (carrier #1)+a 20 MHz carrier (carrier #2)+a 20 MHz carrier (carrier #3)+a 5 MHz carrier (carrier #4).

A wireless communication system supporting multiple carriers refers to a system which can use the above contiguous aggregation and/or non-contiguous carrier aggregation and can use either symmetrical aggregation or asymmetrical aggregation.

In a multi-carrier support system, carriers associated with operation of a multi-carrier mode can be classified into a primary carrier and a secondary carrier.

The primary carrier refers to a carrier used by a BS to exchange traffic and physical (PHY)/MAC control signaling (e.g. a MAC control message) with an MS. Although the BS may use multiple carriers, an MS belonging to the BS may be assigned only one primary carrier. Even if the MS operates in a single carrier mode, the primary carrier is used. The primary carrier is used for a control function for operation of the MS such as network entry.

The secondary carrier is an additional carrier which can be used for traffic by an MS. The secondary carrier may be used only according to a specific command or rule of a BS received on a primary carrier. The secondary carrier may include control signaling to support multi-carrier operation.

Based on the usages and service purposes of the primary carrier and/or the secondary carrier, carriers of a multi-carrier system can be distinguishably classified into a fully configured carrier and a partially configured carrier.

The fully configured carrier is a standalone carrier for which all control channels including synchronization, broadcast, multicast, and unicast control signaling are configured. The fully configured carrier can support both a single carrier MS and a multi-carrier MS.

The partially configured carrier refers to a carrier for downlink dedicated transmission in TDD mode or a downlink carrier that is unpaired with an uplink carrier in FDD mode. The secondary carrier may be used only in conjunction with the primary carrier, and cannot be independently operated to provide an Advanced Air Interface (AAI) service to the MS.

Information as to whether a carrier is a fully configured carrier or a partially configured carrier is indicated by a preamble of a carrier, (i.e. advanced-preamble (A-preamble)). An MS does not attempt to perform network entry or handover for the partially configured carrier. In multi-carrier aggregation, an uplink control channel which is used as a secondary carrier and corresponds to the partially configured carrier may be located at a control area which is certainly not overlapped with uplink of a primary carrier. In order to feed back not only HARQ ACK/NACK corresponding to transmission through a downlink dedicated secondary carrier but also channel quality measurement, the MS uses an uplink control channel on the primary carrier.

The primary carrier is the fully configured carrier, whereas the secondary carrier may be a fully configured carrier or a partially configured carrier according to a usage plan. Assuming that the secondary carrier for a certain MS is a fully configured carrier, this secondary carrier may serve as a primary carrier to another MS. A plurality of MSs having different primary carriers may share the same secondary carrier. In relation to the above description, multi-carrier operations, such as multi-carrier aggregation and multi-carrier switching, may be independently or simultaneously supported.

Multi-carrier aggregation means a multi-carrier mode in which the MS maintains physical layer connectivity and processes data on the secondary carrier while monitoring control signaling on the primary carrier. Resource allocation for the MS may have the range of the primary carrier and several secondary carriers. A link adaptation feedback mechanism includes measurement related to both the primary carrier and the secondary carrier. In a multi-carrier aggregation mode, a system may asymmetrically allocate the secondary carrier to the MS through downlink and/or uplink according to system load (i.e. static/dynamic load balancing), peak data rate, or Quality of Service (QoS) request.

Multi-carrier switching refers to a multi-carrier mode in which the MS switches physical layer connectivity thereof from the primary carrier to the secondary carrier according to indication of the BS. The MS may connect to the secondary carrier during a predetermined time interval, and return to the primary carrier. If the MS connects to the secondary carrier, the MS may not maintain transmission/reception through the primary carrier. The above-mentioned mode is used for switching to the partially configured carrier or the fully configured carrier, so as to receive an Enhanced Multicast Broadcast Service (E-MBS).

The following description may be commonly applied to operations of multi-carrier modes.

A system may define N independent and fully configured carriers. In each of the N independent and fully configured carriers, all synchronization, broadcast, multicast and unicast control signaling channels needed to support the MS of a single carrier mode are configured. Each MS contained in a cell is connected to only one fully configured carrier that is set to the primary carrier, and the status thereof is controlled through the primary carrier. In addition, the system may define M partially configured carriers (where M0), and each of the M partially configured carriers may be used only as the secondary carrier instead of the primary carrier and may be used to transmit downlink dedicated data.

Figure 2:
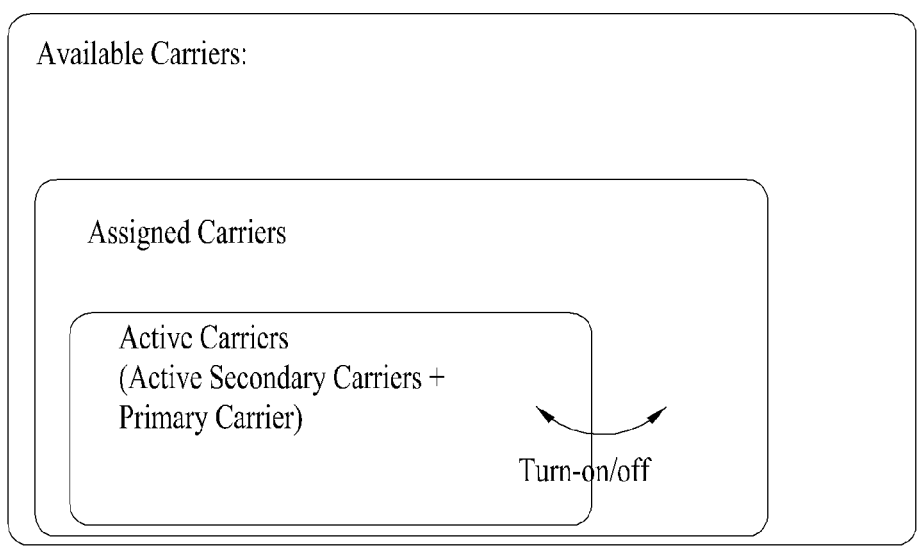
FIG. 2 shows the relationship between available carriers, assigned carriers, and active carriers.

The relationship between available carriers, assigned carriers, and active carriers is described with reference to FIG. 2. A set of all carriers supported by a BS may be referred to as an available carrier. A carrier which is allocated as a subset of available carriers to an MS may be referred to as an assigned carrier. A carrier which is a subset of assigned carriers and is ready to be used for multi-carrier allocation may be referred to as an active carrier.

The available carriers may be located at different parts of the same spectrum block or at non-contiguous spectrum blocks. The BS may provide a few configuration pieces of information about available carriers together with information about a (serving) primary carrier through the primary carrier. Through such messaging, the BS indicates the existence of the MS, bandwidth, duplexing, and spectrum positions of all available carriers so as to support the MS to prepare for all kinds of multi-carrier operations. In addition, the primary carrier may further provide extended information about secondary carrier configuration.

Since an available carrier is a set which is equally applied to all MSs contained in a cell, all MSs belonging to a prescribed BS have the same carrier set. Basic information about the carrier set may be transmitted through a broadcast channel to a Super Frame Header (SFH) and may include a physical carrier index of an assigned carrier. Meanwhile, since the assigned carrier is a subset which can be differently assigned to MSs according to capabilities of the MSs, it may be assigned through a unicast message from the BS during network entry/re-entry of the MS. In this case, a logical carrier index of an assigned carrier may be allocated to the MS together with the assigned carrier allocated thereto, so that the MS can efficiently activate a secondary carrier. Table 1 indicates the definition and attributes of the available carrier, assigned carrier, and active carrier.

TABLE 1

| | Definition & Attributes |
|---|---|
| Available carrier | Multiple carriers usable in an Advanced BS (ABS) All available carriers are not always supported by an Advanced MS (AMS). PHY/MAC processing for available carriers is not present. Referred to as a unique physical carrier index within the ABS. |
| Assigned carrier | A subset of available carriers potentially usable by the AMS. Determined according to capability of the AMS, Service Level Agreement (SLA), available carrier load of the ABS, or other factors. PHY/MAC processed only when indicated by the ABS. Referred to as a logical carrier index. |
| Active carrier | A subset of available carriers prepared to be used for multi-carrier allocation. Determined based on QoS request and other factors. Referred to as a unique logical carrier index for each AMS. Resource allocation information (A-MAP/E-MBS MAP) may be monitored. A broadcast message (within SFH/data burst) is monitored for data transmission/reception. |

Hereinbelow, a carrier management procedure for efficiently using multiple carriers will be described. MAC control messages for carrier management may be defined. For example, in the IEEE 802.16m standard document, carrier management command (AAI_CM-CMD) and carrier management indication (AAI_CM-IND) messages are defined.

Primary carrier change, secondary carrier management (secondary carrier activation and/or deactivation), and carrier switching can be performed by the AAI_CM-CMD message from a BS. The AAI_CM-IND message is a MAC control message transmitted by an MS to the BS in response to the AAI_CM-CMD message.

Activation and deactivation of the secondary carrier will hereinafter be described. Activation or deactivation of the secondary carrier may be determined by the BS based on QoS, load condition of a carrier, and other factors. The BS may activate and/or deactivate the secondary carrier using the AAI_CM-CMD message. The BS may transmit, on the primary carrier, the AAI_CM-CMD message including a downlink/uplink indication type (activation or deactivation), a secondary carrier list (a logical carrier index), and information about a ranging indicator of an activated carrier.

If the MS transmits the AAI_CM-IND MAC control message to the BS through the primary carrier, the BS can confirm that the MS has successfully activated/deactivated the carriers listed in the AAI_CM-CMD message. In case of activation, when downlink/uplink of a newly activated carrier is ready to be used for data traffic transmission, the MS can transmit the AAI_CM-IND message. After receiving the AAI_CM-IND MAC control message, the BS may begin to transmit data on the activated secondary carrier.

The MS may scan other assigned carriers which do not serve the MS in an unsolicited manner or through indication of the BS. The MS may report the scanning result to a serving BS and the scanning result may be used by the BS when the MS determines a carrier to be switched. Then, if a target carrier is not serving a current MS, the MS may perform synchronization with the target carrier.

As described above, in the multi-carrier support system, a multi-carrier support MS may transmit and receive data through one or more carriers. The maximum number of carriers which can be used by any MS may differ according to the capacity of the MS. The MS may require only fewer carriers than the number of carriers which can be used at the maximum capacity of the MS according to service capacity provided at a given time or a policy characteristic of the BS. In this case, while entering a cell and operating in a normal mode, if the multi-carrier MS is ready to receive data on all carriers which can be used according to maximum capacity thereof (i.e. if all carriers which can be used by the MS always operate in a normal mode together with a primary carrier), an MS which does not need to use all carriers may consume unnecessary power. Accordingly, it is necessary for the MS to efficiently manage usable multiple carriers according to service capacity or BS policy.

As described above in conjunction with FIG. 2, carriers within a cell may be classified into available carriers, assigned carriers, and active carriers. A multi-carrier support MS has to include one primary carrier as an active carrier and, if necessary, activates one or more secondary carriers to transmit and receive data.

Hereinafter, an activation and deactivation method of a secondary carrier will be described.

First, a method for activating and deactivating a secondary carrier through explicit signaling using a primary carrier may be considered. In this method, a BS transmits an extension header or a piggyback message to an MS, thereby commanding the MS to activate/deactivate the secondary carrier. However, the above method increases communication overhead because additional signaling through the primary carrier is needed each time the secondary carrier is activated/deactivated.

Alternatively, a method for activating a necessary carrier according to service capacity while the BS and the MS perform a service negotiation procedure may be considered. In this method, information about an active carrier may be transmitted to the MS as part of a QoS parameter. Although this method has low overhead because additional signaling is not needed compared with the previously described explicit signaling method through the primary carrier, overall system efficiency is low because a service negotiation between the BS and the MS is needed again when the active carrier is to be changed.

Hereinafter, embodiments of the present invention capable of efficiently performing secondary carrier management (activation and/or deactivation) will be described. The following embodiments are characterized in that secondary carrier management is performed using control channel allocation/deallocation of a target carrier.

First, a downlink Carrier to Interference plus Noise Ratio (CINR) report operation will now be described. In an OFDMA mode, the MS may report physical CINR measurement or effective CINR measurement using a report response (REP-RSP) message or a fast feedback channel (CQICH). A physical CINR is measured by the MS according to indication of the BS and is defined as being reported to the BS by inducing and updating the average of physical CINR measurement values and/or the estimation value of normal distribution. An effective CINR is a function of the physical CINR and has a variable value according to a channel condition etc. These measurement values may be reported with respect to one of a preamble, a midamble, or a permutation zone.

The REP-RSP message is a response message of the MS to a report request (REP-REQ) message from the BS. The REP-REQ message is a message transmitted to the MS in order to request the MS to report a desired modulation and coding rate when the BS has data to be transmitted to the MS and when the BS makes a determination as to which modulation and coding rate is to be applied. If the BS transmits the REP-REQ message to the MS, the MS may transmit the REP-RSP message including desired modulation and coding rate information to the BS on a contention basis.

Meanwhile, a Channel Quality Indicator Channel (CQICH) is an additional control channel allocated for each MS so that the MS may periodically report a channel environment thereof to the BS. Hereinbelow, periodic CINR reporting through the fast feedback channel (CQICH) will be described in detail.

If the MS is powered on, the MS searches information about all channel environments (all subchannels except for a band Adaptive Modulation and Coding (AMC) subchannel) which can be supported by the MS and shares the information with the BS. The moment the BS and the MS share information regarding capabilities of each other's modulation and coding rate, the BS may allocate a CQICH subchannel using a CQICH Information Element (IE) to the MS so as to report a periodic CINR. The CQICH IE may be one of, for example, a CQICH allocation IE, a CQICH enhanced allocation IE (CQICH_Enhanced_Alloc_IE), and a CQICH Control IE.

Figure 3:
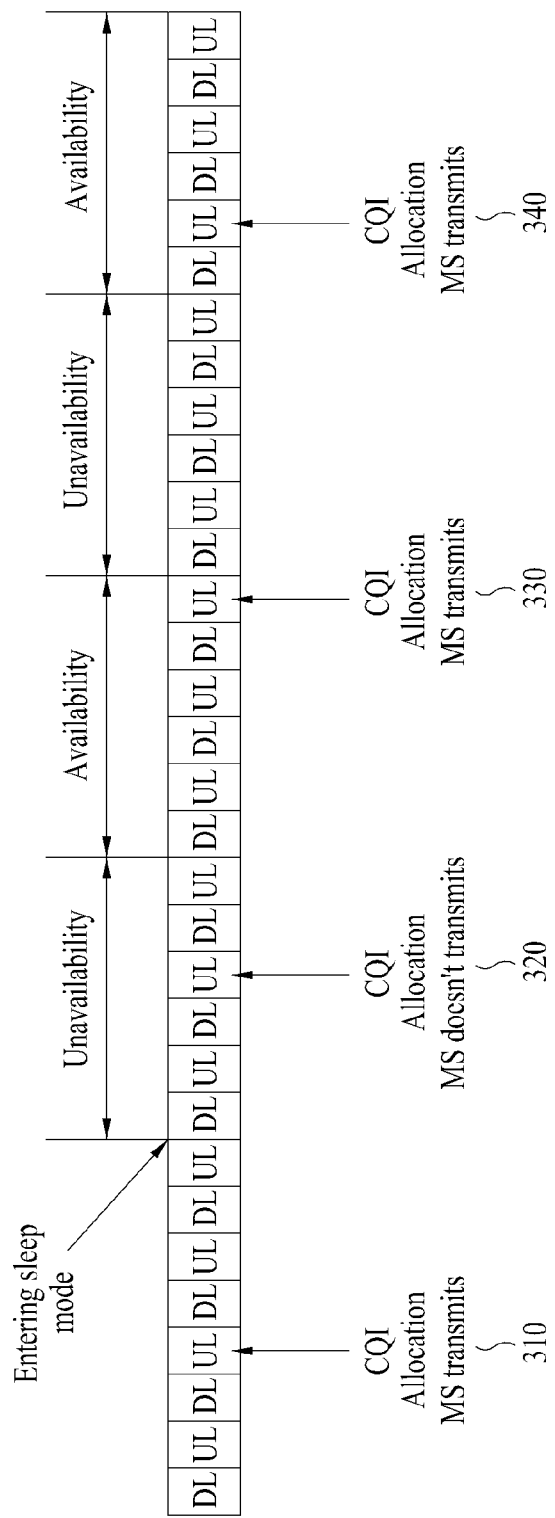
FIG. 3 shows CQI transmission during a sleep mode.

CQI transmission and CQICH Allocation IE (CQICH_Alloc_IE) format during a sleep mode will now be described with reference to FIG. 3. The CQICH_Alloc_IE is used to dynamically allocate or deallocate the CQICH to the MS. If the CQICH is allocated to the MS, the MS transmits CQI information on a CQICH designated in subsequent frames until the MS receives a CQICH_Alloc_IE indicating deallocation of the CQICH or until the MS receives a sleep control message (MOB_SLP-RSP, RNG-RSP, or downlink sleep control extension subheader), Stop_CQI_Allocation_Flag of which is set to 1 (step 310). Determination as to whether to use the reported CQI in the sleep mode depends on the BS. The BS may selectively use the Stop_CQI_Allocation_Flag in order to deallocate the CQICH. The MS does not perform transmission on the allocated CQICH during an unavailability interval in the sleep mode (step 320). If the MS transmits a bandwidth request for connection belonging to a power saving class during the sleep mode while a traffic triggered wakening flag is set to 1, the MS continues to perform transmission on the allocated CQICH. The MS which is in the sleep mode continues to perform transmission on the allocated CQICH slot during an availability interval (steps 330 and 340). An example of the CQICH_Alloc_IE format is shown in Table 2.

TABLE 2

| Syntax | Size (bits) | Notes |
|---|---|---|
| CQICH Alloc_IE( ) { | — | |
|   Extended UIUC | 4 | CQICH = 0 × 3 |
|   Length | 4 | Length in bytes (variable) |
|   CQICH_ID | Variable | Index to uniquely identify CQICH resource assigned to SS. The size of this field depends on system parameters defined in UCD. |
|   Allocation offset | 6 | Index for fast feedback region marked by UIUC = 0. |
|   Period (p) | 2 | A CQI feedback is transmitted through CQICH every $2^p$ frame. |
|   Frame offset | 3 | SS starts reporting at the frame of which number has the same 3 LSBs as the specified frame offset. If the current frame is specified, the SS should start reporting in eight frames. Channel quality information reported by an MS in Frame n pertains to measurements collected in previous frames up to and including Frame n − 1 but excluding Frame n. The first CQICH report following the |

TABLE 2-continued

| Syntax | Size (bits) | Notes |
| --- | --- | --- |
| | | CQICH allocation IE may contain invalid CQI data if the CQICH report is set in the frame immediately following the frame in which the CQICH allocation IE was received. |
| Duration (d) | 3 | A CQI feedback is transmitted on CQI channels for $10*2^d$ frames. If d == 0, CQICH is deallocated. If d == 0b011, the SS should report until the BS commands SS to stop. |
| Report configuration included | 1 | Update to CINR report configuration is included. |
| If(report configuration included == 1) { | — | — |
|    Feedback Type | 2 | 0b00: Physical CINR feedback<br>0b01: Effective CINR feedback<br>0b10-0b11: Reserved |
|    Report type | 1 | 0: Report for preamble<br>1: Report for specific permutation zone |
|    If(Report type == 0) { | — | — |
|      CINR preamble report type | 1 | The type of preamble-based CINR report<br>0: Frequency reuse factor = 1 configuration<br>1: Frequency reuse factor = 3 configuration |
|    } | — | — |
|    Else { | — | Report for permutation zone |
|      Zone permutation | 3 | The type of zone for which to report<br>0b000: PUSC with Use All SC = 0 or first DL zone when not all subchannels are used.<br>0b001: PUSC with Use All SC = 1 or first DL zone when all subchannels are used.<br>0b010: FUSC<br>0b011: Optional FUSC<br>0b100: Safety channel zone<br>0b101: AMC zone (for AMC zone with dedicated pilots or DL AAS zone)<br>0b110-111: Reserved |
|      Zone type | 2 | 0b00: Non-STC zone<br>0b01: STC zone<br>0b10: AAS zone or non-STC zone with dedicated pilots<br>0b11: STC zone with dedicated pilots |
|      Zone PRBS_ID | 2 | The PRBS_ID of the zone on which to report or the segment number as indicated by the frame preamble for the first DL zone or DL AAS zone with Diversity_MAP support. |
|      If (Zone permutation == 0b000 or 0b001) { | — | — |
|         Major group indication | 1 | If 0, then the report may refer to any subchannel in the PUSC zone. |
|         If (Major group indication ==1){ | — | — |
|            PUSC Major group bitmap | 6 | Reported CINR shall only apply to the subchannels of PUSC major groups for which the corresponding bit is set. Bit#k refers to major group k. |
|         } | — | — |
|      } | — | — |
|      CINR zone measurement type | 1 | 0: Measurement from pilot subcarriers and, if AAS zone, from AAS preamble<br>1: Measurement from data subcarriers |
|    } | — | — |
|    If (feedback type == 0b00){ | | Physical CINR feedback |
|      Average parameter included | 1 | — |
|      If (Averaging parameter included ==1){ | — | — |
|         Averaging parameter | 4 | Averaging parameter used for |

TABLE 2-continued

| Syntax | Size (bits) | Notes |
|---|---|---|
| | | deriving physical CINR estimates reported through CQICH. This value is given in multiples of 1/16 in the range of [1/16, 16/16]in increasing order. |
| } | — | — |
| } | — | — |
| } | — | — |
| MIMO_permutation_feedback_cycle | 2 | 0b00 = No MIMO and permutation mode feedback<br>0b01 = The MIMO and permutation mode indication shall be transmitted on the CQICH indexed by the CQICH_ID every four allocated CQICH transmission opportunities.<br>0b10 = The MIMO and permutation mode indication shall be transmitted on the CQICH indexed by the CQICH_ID every eight allocated CQICH transmission opportunities. The first indication is sent on the eighth allocated CQICH transmission opportunity.<br>0b11 = MIMO and permutation mode indication shall be transmitted on the CQICH indexed by the CQICH_ID every 16 allocated CQICH transmission opportunities. The first indication is sent on the 16th allocated CQICH transmission opportunity. |
| Padding | variable | Number of bits required to align to byte length. Shall be set to zero. |
| } | — | — |

As described above, since a CQI report from the MS can be used to efficiently transmit downlink data by the BS, the BS may receive the CQI report from the MS before starting to transmit data. Since the MS transmits the CQI report through uplink, the MS should receive a CQICH from the BS for CQI report transmission. In a single-carrier system, the CQICH may be allocated to an arbitrary MS, and the MS may periodically report CQI to the BS by configuring a duration interval and period.

As described above, the CQI report of the MS to the BS for efficient downlink data transmission of the BS is equally applied even to a multi-carrier support communication system. A multi-carrier support MS may perform initial ranging and initial network entry procedures through one fully configured carrier among available carriers supported by the BS during initial network entry. The MS may configure a carrier which has performed initial network entry as a primary carrier before transmitting and receiving data to and from the BS and perform, through the primary carrier, a capability negotiation procedure for exchanging information about multi-carrier capabilities, such as carrier aggregation or carrier switching, with the BS. Upon completing the initial network entry procedure through the primary carrier, the BS may transmit a CQICH allocation IE (CQICH_Alloc_IE) for allocating the CQICH to the MS in order to receive the CQI report for the primary carrier of the MS before transmitting and receiving actual data to and from the MS. The MS which has entered a cell first has only one primary carrier as an active carrier. Such an MS may require use of an additional secondary carrier according to characteristics of an additionally provided service. Alternatively, as a prescribed service provided to the MS which has used multiple carriers is ended, one or more secondary carriers which have been used may not be needed any more. According to the above-described conventional multi-carrier management procedure, activation/deactivation of the secondary carrier has been performed through specific signaling or service negotiations between the BS and the MS.

Activation/Deactivation Method of Secondary Carrier Using CQICH Alloc IE

Hereinafter, an embodiment of the present invention for implicitly indicating activation and deactivation of a secondary carrier using CQICH allocation and deallocation will be described.

As described earlier, before transmitting and receiving data to and from an MS through any carrier, since a BS needs to receive a CQI report on that carrier from the MS, the BS may allocate a CQICH, which is a control channel for receiving the CQI report, to the MS. Accordingly, CQICH allocation for any carrier is a process basically performed to transmit and receive data through the carrier. In the present invention, a new method is introduced in terms of such an attribute of CQICH allocation, wherein the method uses CQICH allocation for any carrier as an activation indication for the carrier and uses CQICH deallocation for any carrier as a deactivation indication for the carrier. According to the present invention, activation and deactivation of a carrier can be performed by an implicit indication of CQICH allocation/deallocation for the carrier without depending on additional signaling for activation/deactivation of the carrier.

The present embodiment will now be described in detail with reference to FIG. 4

When an MS initially enters a network, the MS may receive physical indexes and configuration information of all available carriers supported by a BS through broadcast information (e.g. multi-carrier advertisement (AAI_MC-ADV) message) from the BS (step 401). It is assumed in an example of FIG. 4 that the available carriers are 0, 1, 2, 3, and 4 and a primary carrier for the MS is set to carrier 1 which has detected an A-preamble first. The primary carrier is mapped to Logical Carrier Index (LCI) 0.

An allocation carrier for the MS may be set through a negotiation procedure during network entry. Carriers 1, 2, and 3 may be sequentially allocated as assigned carriers to LCIs 0, 1, and 2. If carriers 1, 2, and 4 are set as assigned carriers, the carriers 1, 2, and 4 may be mapped to LCIs 0, 1, and 2, respectively. In the following description, an LCI refers to a carrier indicated by that index.

Figure 4:
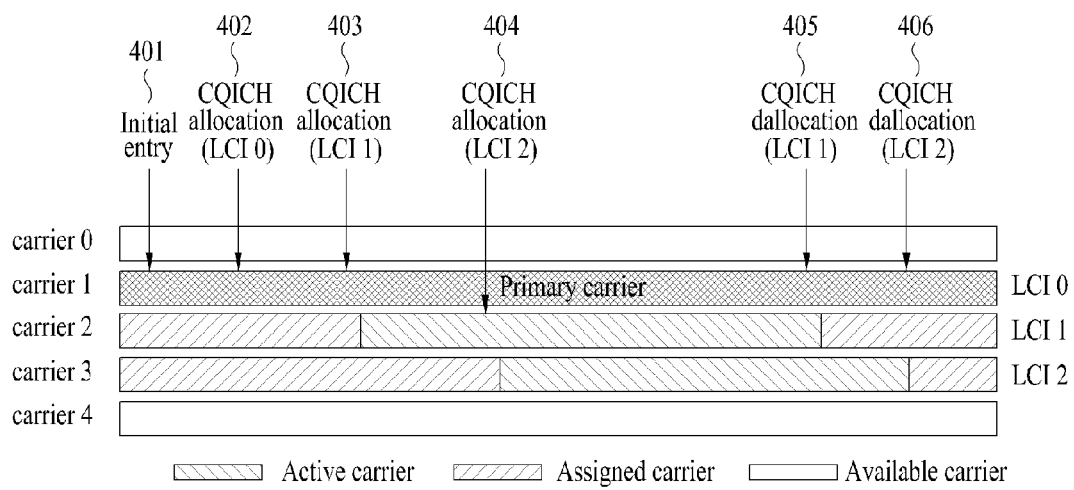
FIG. 4 is a diagram showing carrier activation and deactivation operations according to an embodiment of the present invention.

As illustrated in FIG. 4, the LCIs 1 and 2 among the assigned carriers are still in inactive states until they are indicated by the BS. Meanwhile, the BS may exchange data with the MS through the LCI 0 which is an active carrier. For data exchange with the MS through the LCI 0, the BS may transmit an CQICH_Alloc_IE, which requests a CQI report for the LCI 0 received from the MS, to the MS on the LCI 0 (step 402).

An activation method for the LCIs 1 and 2 which are secondary carriers in a deactivated state will now be described.

In a multi-carrier support system, a carrier indicator indicating whether to allocate/deallocate a CQICH for any carrier in the CQICH_Alloc_IE format may be additionally defined. The carrier indicator may be an LCI or a physical carrier index.

Activation for the LCI 1 may be performed by CQICH allocation through an already activated carrier (e.g. primary carrier LCI 0). For example, upon receiving a CQICH_Alloc_IE for allocating a CQICH to the LCI 1 from the BS through the LCI 0, the MS may change the LCI 1 to an activated state according to an implicit indication of the CQICH_Alloc_IE (step S403).

Next, activation for the LCI 2 may be performed by reception of a CQICH_Alloc_IE through an already activated carrier (e.g. the primary carrier LCI 0 or subcarrier LCI 1). For example, upon receiving a CQICH_Alloc_IE for allocating a CQICH to the LCI 2 from the BS through the LCI 1, the MS may change the LCI 2 to an activated state according to an implicit indication of the CQICH_Alloc_IE (step S404).

A deactivation method for the LCIs 1 and 2 which have been activated will now be described.

Deactivation of the LCI 1 may be performed by CQICH deallocation for the LCI 1. For example, upon receiving a CQICH_Alloc_IE for deallocating a CQICH to the LCI 1 from the BS through the LCI 0 (or any carrier which is being activated), the MS may change the LCI 1 to a deactivated state according to an implicit indication of the CQICH_Alloc_IE (step S405).

Deactivation of the LCI 2 may be performed by CQICH deallocation of the LCI 2. For example, upon receiving a CQICH_Alloc_IE for deallocating a CQICH to the LCI 2 from the BS through the LCI 0 (or any carrier which is being activated), the MS may change the LCI 2 to a deactivated state according to an implicit indication of the CQICH_Alloc_IE (step S406).

As described above, the CQICH_Alloc_IE for indicating CQI allocation or deallocation for any carrier may be received from the BS on any active carrier. That is, if it is desired to activate a secondary carrier which is in a deactivated state (i.e. an assigned carrier or available carrier state), the secondary carrier can be activated by transmitting the CQICH_Alloc_IE for requesting a CQI report to the MS on any active carrier by allocation of a CQICH for the corresponding secondary carrier. In addition, if it is desired to deactivate a secondary carrier which is in an activated state (i.e. change to an assigned carrier or available carrier state), the secondary carrier can be deactivated by transmitting the CQICH_Alloc_IE for requesting CQICH deallocation for the corresponding secondary carrier to the MS on any active carrier.

In a multi-carrier system, a secondary carrier can be used when an MS is in a normal mode. When the MS enters a sleep mode or idle more, deactivation (i.e. change to an assigned carrier or available carrier) of all secondary carriers belonging to active carriers may be considered without additional signaling. The present embodiment provides a method for activating and/or deactivating any carrier between the BS and the MS without additional signaling, and therefore, communication overhead can be greatly reduced.

Activation/Deactivation Method of Secondary Carrier using Feedback Allocation A-MAP IE Hereinbelow, another embodiment of the present invention for activating and/or deactivating a secondary carrier through a feedback allocation A-MAP IE will be described.

A multi-carrier support MS needs to report, to a BS, CQI information only for active carriers used for actual data transmission and reception within assigned carriers (or available carriers) which can be used thereby and the CQI information should be transmitted to the BS on the active carriers before data is transmitted.

The feedback allocation A-MAP IE is used to dynamically allocate or deallocate an uplink fast feedback control channel (including a Primary Fast Feedback Channel (PFBCH) and a Secondary Fast Feedback Channel (SFBCH)) to the MS. When the MS includes a fast feedback control channel for an active downlink carrier, if the MS receives a new feedback channel for the same active downlink carrier, the existing fast feedback channel is automatically deallocated.

For Multiple-Input Multiple-Output Feedback Mode (MFMs) 0, 1, 4, and 7 (MFMs 0 and 1 relate to a measurement operation within an open-loop area and MFMs 0, 4, and 7 relate to a measurement operation other than the open-loop area), the BS may direct the MS to feed back a broadband CQI and a Space Time Coding (STC) rate for one active frequency part using the feedback allocation A-MAP IE. That is, the feedback allocation A-MAP IE may be used for CQICH allocation. An example of a feedback allocation A-MAP IE format is as shown in Table 3.

TABLE 3

| Syntax | Size in bits | Description/Notes |
| --- | --- | --- |
| A-MAP IE Type | [4] | Basic_FB_Alloc_IE |
| Channel Index (CI) | 6 [10] | The index of fast feedback channel |

TABLE 3-continued

| Syntax | Size in bits | Description/Notes |
|---|---|---|
| MFM (MIMO feedback mode) | 4 [14] | To decide the feedback contents and related MS processing<br>See table y |
| Second Channel Allocation | 1 [15] | If MFM == 0b0011, 0b0100, 0b0101, 0b0110, 0b1000, 0b1001, 0b1010, 0b1011, 0b1100, follow as below.<br>0b0: The second FBCH is allocated in the same subframe of first FBCH. If first allocated FBCH's index is CI, then the other FBCH's index is CI + 1.<br>0b1: The second FBCH is allocated in the next UL subframe with same FBCH index. |
| DLRU | 3 [18] | Downlink LRU indicating which RUs or which type of RU to work on for feedback<br>0b000: Whole bandwidth<br>0b001: Subband CRUs in frequency partition 0<br>0b010: Subband CRU in power boosted reuse N frequency partition<br>0b011: Subband CRU in non power boosted reuse N frequency partition<br>0b100: DRU/mini-band CRU in frequency partition 0<br>0b101: DRU/mini-band CRU in power boosted reuse N frequency partition<br>0b110: DRU/mini-band CRU in non power boosted reuse N frequency partition<br>0b111: Whole bandwidth over whole carriers |
| CM (Codebook feedback mode) | 2 [20] | 0b00: standard<br>0b01: adaptive<br>0b10: differential<br>0b11: Reserved |
| CCE (Codebook coordination enable) | 1 [21] | 0b0: Disable<br>0b1: Enable |
| Allocation Duration (d) | 3 [24] | The allocation is valid for 2(d − 1) frame starting from the frame defined by allocation relevance.<br>If d == 0b000, the prescheduled feedback header transmission is released.<br>If d == 0b111, the prescheduled feedback header transmission shall be valid until the BS commands to release it. |
| Long period (p) | 2 [26] | Long-term feedback is transmitted on PFBCH every 2p superframes |
| Short period (q) | 2 [28] | Short-term feedback is transmitted on FBCH every 2q frames |
| Logical Carrier Index (or Carrier Index of assigned carrier want to be activated) | 3 [31] | 0b000: Primary carrier<br>0b001: Secondary carrier 1<br>0b010: Secondary carrier 2<br>0b011: Secondary carrier 3<br>0b100: Secondary carrier 4<br>0b101: Secondary carrier 5<br>0b110: Secondary carrier 6<br>0b111: Secondary carrier 7 |
| Padding | variable [1] [32] | Padding to reach byte boundary |
| MCRC | [16] [48] | 16 bit CRC masked by Station ID |

As described in Table 3, CQICH allocation for a multi-carrier support MS using the feedback allocation A-MAP IE may involve allocating a CQICH resource to the MS so as to periodically transmit a CQI report during a determined duration every carrier among multiple carriers.

Meanwhile, the above-described CQICH deallocation corresponds to release of the CQI report using the feedback allocation A-MAP IE. The release of the CQI report for each carrier may be indicated by reserving a specific bit value (e.g. 0b111) of an allocation duration field of the feedback allocation A-MAP IE format. Alternatively, CQICH deallocation for each carrier may be indicated using a sleep control message (MOB_SLP-RSP, RNG-RSP, or downlink sleep control extended subheader), a Stop_CQI_Allocation_Flag of which is set to 1.

Among multiple carriers, a carrier to which a CQICH is allocated (or deallocated) may be indicated by an LCI field of the feedback allocation A-MAP IE. Alternatively, a carrier to which a CQICH is allocated (or deallocated) may be indicated through a physical index by defining a physical carrier index field instead of the LCI field.

Similarly to indication of activation/deactivation of the secondary carrier using the above-mentioned CQICH_Alloc_IE, the activation and/or deactivation of the secondary carrier may be implicitly indicated using a feedback allocation A-MAP IE. Namely, upon receiving a feedback allocation A-MAP IE indicating CQICH allocation for a secondary carrier of a deactivated state from the BS, the MS may change the corresponding secondary carrier to an activated state according to an implicit indication of the feedback allocation A-MAP IE. Upon receiving a feedback allocation A-MAP IE indicating CQICH deallocation for a secondary carrier of an activated state from the BS, the MS may change the corresponding secondary carrier to a deactivated state according to an implicit indication of the feedback allocation A-MAP IE.

Efficient Carrier Management Method for Uplink Carrier

Activation and/or deactivation of a carrier may be performed by explicit signaling as described above or may be performed by a service negotiation procedure between the BS and the MS. This may be applied to both uplink and downlink.

Meanwhile, a method for reducing communication overhead and efficiently managing a carrier may be considered by implicitly indicating the activation/deactivation of a secondary carrier through allocation/deallocation of a CQICH which is a fast feedback control channel. Since the CQICH allocation is to transmit a downlink CQI report by the MS for downlink data transmission to the MS from the BS, an implicit indication method for carrier activation/deactivation using CQICH allocation/deallocation may be applied to a downlink carrier.

Hereinafter, embodiments of the present invention for efficiently activating/deactivating a carrier using control channel allocation/deallocation even with respect to uplink will be described.

First, ranging channel allocation will now be described. In uplink from the MS to the BS, signals from several MSs may arrive at different timings according to factors such as propagation delay etc. Then since it is difficult for the BS to receive the signals from the respective MSs, an additional timing adjustment method for correctly establishing synchronization for an uplink transmission time is needed and this is called ranging. Ranging refers to a procedure including exchange of a MAC control message for adjusting an uplink timing and power and an operation of the MS and BS according to exchange of the message. If a power is applied to the MS, the MS performs initial ranging to adjust uplink timing offset and transmission power. Periodic ranging refers to a process of periodically tracking uplink timing offset and received signal intensity after initial ranging. In relation to a ranging procedure, the MS may select an arbitrary ranging code or the BS may allocate a dedicated ranging code (or resource) to the MS. The MS may attempt to perform ranging to the BS through a ranging channel using the arbitrarily selected ranging code or the dedicated ranging code received from the BS. In this case, the MS may use a periodic ranging resource.

Since the above-described ranging is necessary for correctly transmitting and receiving uplink data, ranging for uplink is performed before the uplink data is transmitted and received. In other words, timing/power adjustment through a ranging channel, which is a control channel, should be previously performed in order to use an uplink carrier. Upon receiving a ranging code for a deactivated carrier from the BS, the MS recognizes that activation for the corresponding carrier is implicitly indicated and may activate the corresponding carrier, according to attributes of the ranging procedure.

Meanwhile, a sounding channel, which is a control channel for causing the BS to recognize an uplink channel state, may be allocated to the MS. The MS may transmit an uplink pilot signal to the BS through the allocated sounding channel. Similarly to implicit activation indication of an uplink carrier through the above-described ranging code allocation, activation of the corresponding uplink carrier may be implicitly indicated by allocating an uplink sounding channel. A carrier activation method through sounding channel allocation may be performed when it is difficult to apply the aforementioned dedicated ranging channel allocation method. On the other hand, deactivation of the corresponding uplink carrier may be implicitly indicated by deallocating the sounding channel.

Figure 5:
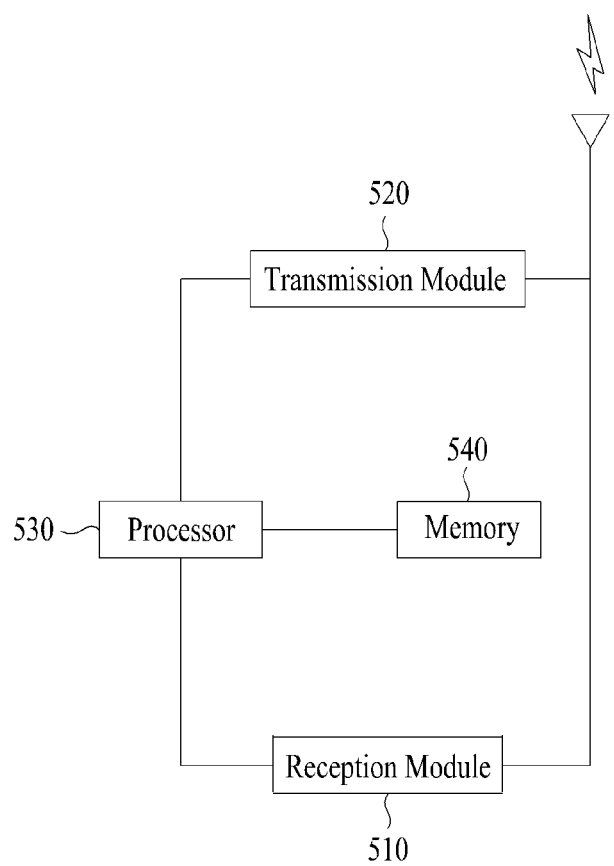
FIG. 5 is a diagram showing the configuration of an exemplary embodiment of an MS according to the present invention.

FIG. 5 is a diagram showing the configuration of an exemplary embodiment of an MS according to the present invention.

Referring to FIG. 5, the MS may include a reception module 510, a transmission module 520, a processor 530, and a memory 540. The reception module 510 may externally receive various data and information. The transmission module 520 may transmit various signals, data, and information to a BS etc. The MS according to the present embodiment may perform carrier management in a multi-carrier support communication system.

The processor 530 of the MS may control the reception module 510 to receive a signal indicating control channel allocation for a first carrier from the BS and to receive a signal indicating control channel deallocation for a second carrier from the BS. The processor 530 of the MS may control the first carrier to be activated when the first carrier for which control channel allocation is indicated is in a deactivated state and control the second carrier to be deactivated when the second carrier for which control channel deallocation is indicated is in an activated state.

In addition, the processor 530 performs an operational processing function upon information received by the MS and information to be transmitted to the exterior. The memory 540 may store the operationally processed information for a predetermined time and may be replaced with a constituent element such as a buffer (not shown).

Figure 6:
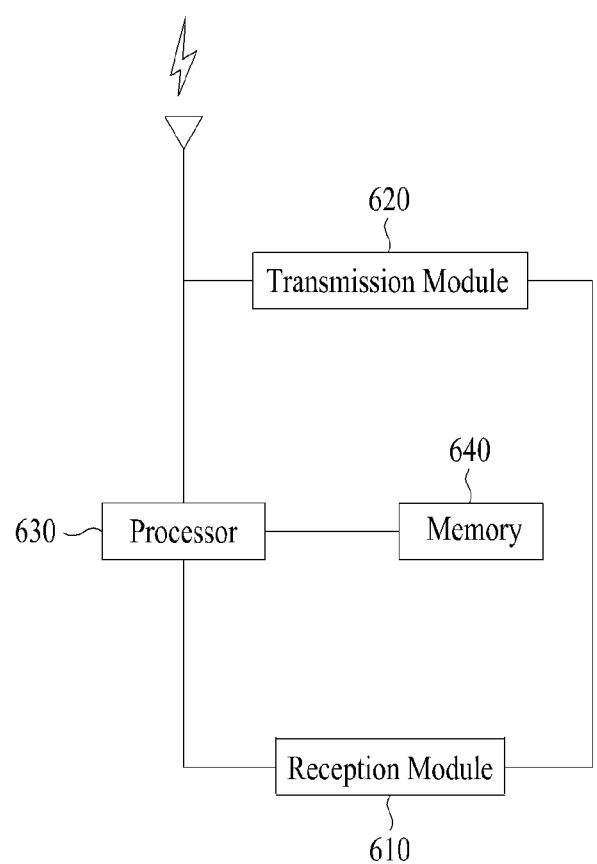
FIG. 6 is a diagram showing the configuration of an exemplary embodiment of a BS according to the present invention.

FIG. 6 is a diagram showing the configuration of an exemplary embodiment of a BS according to the present invention.

Referring to FIG. 6, the BS may include a reception module 610, a transmission module 620, a processor 630, and a memory 640. The transmission module 620 may transmit various signals, data, and information to an MS etc. The reception module 610 may receive various signals, data and information from the MS etc. The BS according to the present embodiment may support carrier management in a multi-carrier support communication system.

The processor 630 of the BS may control the transmission module 620 to transmit a signal indicating control channel allocation for a first carrier to the MS and to transmit a signal indicating control channel deallocation for a second carrier to the MS. The first carrier is activated when the first carrier for which control channel allocation is indicated is in a deactivated state and the second carrier is deactivated when the second carrier for which control channel deallocation is indicated is in an activated state.

In addition, the processor 630 performs an operational processing function upon information received by the BS and information to be transmitted to the exterior. The memory 640 may store the operationally processed information for a predetermined time and may be replaced with a constituent element such as a buffer (not shown).

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via a variety of well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method for performing carrier management in a mobile station of a communication system supporting multiple carriers, the method comprising:
  receiving, on a third carrier, a signal indicating allocation of a control channel for a first carrier from a base station;
  receiving, on the third carrier, a signal indicating deallocation of the control channel for a second carrier from the base station;
  activating the first carrier, in addition to at least one already-activated carrier, when the first carrier for which allocation of the control channel is indicated is in a deactivated state, wherein the activation of the first carrier is triggered by the allocation of the control channel for the first carrier instead of explicit signaling for activating the first carrier; and
  deactivating the second carrier when the second carrier for which deallocation of the control channel is indicated is in an activated state, wherein the deactivation of the second carrier is triggered by the deallocation of the control channel for the second carrier instead of explicit signaling for deactivating the second carrier,
  wherein the third carrier is included in the at least one already-activated carrier, and
  wherein a primary carrier is included in the at least one already-activated carrier, and the primary carrier is not switched to another carrier after the activation of the first carrier or after the deactivation of the second carrier.

2. The method of claim 1, wherein the first and second carriers are secondary carriers among the multiple carriers.

3. The method of claim 1, wherein the first and second carriers are downlink carriers and the control channel is a Channel Quality Indicator Channel (CQICH).

4. The method of claim 1, wherein the first and second carriers are uplink carriers and the control channel is either a ranging channel or a sounding channel.

5. A method for supporting carrier management in a base station of a communication system supporting multiple carriers, the method comprising:
  transmitting, on a third carrier, a signal indicating allocation of a control channel for a first carrier to a mobile station; and
  transmitting, on the third carrier, a signal indicating deallocation of the control channel for a second carrier to the mobile station;
  wherein the first carrier is activated, in addition to at least one already-activated carrier, when the first carrier for which allocation of the control channel is indicated is in a deactivated state, wherein the activation of the first carrier is triggered by the allocation of the control channel for the first carrier instead of explicit signaling for activating the first carrier, and
  wherein the second carrier is deactivated when the second carrier for which deallocation of the control channel is indicated is in an activated state, wherein the deactivation of the second carrier is triggered by the deallocation of the control channel for the second carrier instead of explicit signaling for deactivating the second carrier,
  wherein the third carrier is included in the at least one already-activated carrier, and
  wherein a primary carrier is included in the at least one already-activated carrier, and the primary carrier is not switched to another carrier after the activation of the first carrier or after the deactivation of the second carrier.

6. The method of claim 5, wherein the first and second carriers are secondary carriers among the multiple carriers.

7. The method of claim 5, wherein the first and second carriers are downlink carriers and the control channel is a Channel Quality Indicator Channel (CQICH).

8. The method of claim 5, wherein the first and second carriers are uplink carriers and the control channel is either a ranging channel or a sounding channel.

9. A mobile station performing carrier management in a communication system supporting multiple carriers, the mobile station comprising:
  a receiver;
  transmitter; and
  a processor connected to the receiver and the transmitter and configured to:
    receive, on a third carrier, through the reception module, a signal indicating allocation of a control channel for a first carrier from the base station,
    receive, on the third carrier, through the reception module, a signal indicating deallocation of the control channel for a second carrier from the base station,
    activate the first carrier, in addition to at least one already-activated carrier, when the first carrier for which allocation of the control channel is indicated is in a deactivated state, wherein the activation of the first carrier is triggered by the allocation of the control channel for the first carrier instead of explicit signaling for activating the first carrier, and
    deactivate the second carrier when the second carrier for which deallocation of the control channel is indicated is in an activated state, wherein the deactivation of the second carrier is triggered by the deallocation of the control channel for the second carrier instead of explicit signaling for deactivating the second carrier,
    wherein the third carrier is included in the at least one already-activated carrier, and
    wherein a primary carrier is included in the at least one already-activated carrier, and the primary carrier is not switched to another carrier after the activation of the first carrier or after the deactivation of the second carrier.

10. A base station supporting carrier management in a communication system supporting multiple carriers, the base station comprising:

a receiver;

transmitter; and a processor connected to the receiver and the transmitter and configured to:
  transmit, on a third carrier, through the transmission module, a signal indicating allocation of a control channel for a first carrier to the mobile station, and
  transmit, on the third carrier, through the transmission module, a signal indicating deallocation of the control channel for a second carrier to the mobile station, wherein the first carrier is activated in addition to at least one already-activated carrier, when the first carrier for which allocation of the control channel is indicated is in a deactivated state, wherein the activation of the first carrier is triggered by the allocation of the control channel for the first carrier instead of explicit signaling for activating the first carrier, and wherein the second carrier is deactivated when the second carrier for which deallocation of the control channel is indicated is in an activated state, wherein the deactivation of the second carrier is triggered by the deallocation of the control channel for the second carrier instead of explicit signaling for deactivating the second carrier, wherein the third carrier is included in the at least one already-activated carrier, and wherein a primary carrier is included in the at least one already-activated carrier, and the primary carrier is not switched to another carrier after the activation of the first carrier or after the deactivation of the second carrier.

* * * * *